US005574416A

United States Patent [19]

Maruyama et al.

[11] Patent Number: 5,574,416

[45] Date of Patent: Nov. 12, 1996

[54] ELECTROMAGNETIC RELAY

[75] Inventors: Terutaka Maruyama, Toyota; Seiji Kawai, Seto; Hiroyuki Hirata, Nukata-gun, all of Japan

[73] Assignee: Nippondenso Co., Ltd., Kariya, Japan

[21] Appl. No.: 571,639

[22] Filed: Dec. 13, 1995

[30] Foreign Application Priority Data

Dec. 26, 1994 [JP] Japan .................................... 6-322102

[51] Int. Cl.[6] .................................................... H01M 51/22

[52] U.S. Cl. .................................. 335/78; 335/80; 335/85

[58] Field of Search ................................ 335/78–86, 124, 335/128, 130, 131

[56] References Cited

U.S. PATENT DOCUMENTS 2,632,072 3/1953 Zellner ...................................... 335/78

3,142,784 7/1964 Bloomfield ................................ 335/80

*Primary Examiner*—Lincoln Donovan

*Attorney, Agent, or Firm*—Cushman, Darby & Cushman

[57] ABSTRACT

An electromagnetic relay is composed of a coil wound around magnetic core, a U-shaped magnetic pole member connected to an end of the magnetic core and provides a space, a yoke member connected to the other end of the magnetic core, an armature movably connected to the yoke and disposed in the space, a permanent magnet secured to the armature near the magnetic core and supporting member supporting the armature. Since the permanent magnet is disposed near the magnetic core, magnetic flux of the permanent magnet can be utilized effectively and, therefore, the size of the relay can be reduced.

14 Claims, 2 Drawing Sheets

ELECTROMAGNETIC RELAY

CROSS REFERENCE TO RELATED APPLICATION

The present application is based on and claims priority from Japanese Patent Applications Hei 6-322102, filed on Dec. 26, 1994, the contents of which are incorporated herein by reference.

BACKGROUND OF THE INVENTION

1. Field of the Invention

The present invention relates to an electromagnetic relay, and particularly relates to an electromagnetic relay for a vehicle.

2. Description of Related Art

Numbers of electromagnetic relays have been used in a vehicle and various systems, and they are also increasing. When the number of electromagnetic relays used in a vehicle increases, electric power consumption thereof becomes an important factor to be considered. Further, highly sensitive and less-power consuming electromagnetic relays have been wanted in order to equip them with integrated-circuit controllers.

Japanese Utility Model Unexamined Publication 60-155153 discloses such an electromagnetic relay. In this conventional relay, an armature is retracted by a magnet although driven by an electromagnetic coil to operate a switch, and a spring member biases the armature to stay at a middle portion between a position of the armature being retracted by the magnet and a position of the same being driven by the electromagnetic coil. As a result, electric energy required to drive the spring is small so that energy consumption of the relay can be reduced. However, the above relay is composed of many parts and the structure thereof, and is rather complicated, thereby resulting in problems of accuracy and high production cost. In addition, since the permanent magnet is disposed remote from where the armature is driven, leakage of the magnetic flux is considerable and comparatively large sized permanent magnet has to be installed.

SUMMARY OF THE INVENTION

The present invention is made in view of the above problems, and a primary object of the present invention is to provide a simple-structured and low energy consuming electromagnetic relay which has a comparatively small-sized permanent magnet.

Another object of the present invention is to provide an electromagnetic relay which has a retracting permanent magnet disposed near members for driving the armature.

Another object of the present invention is to provide an electromagnetic relay which includes a coil and a magnetic core for generating magnetomotive force, a magnetic pole member, a yoke member, an armature member disposed to move in a space between the magnetic pole member and the magnetic core member in response to magnetomotive force generated by the coil, a permanent magnet disposed near the armature member and the magnetic core, and means for supporting the armature member in the space between the magnetic pole member and the magnetic core.

Another object of the present invention is to provide an electromagnetic relay in which the magnetic pole member comprises a U-shaped magnetic plate one side of which is connected to said upper surface of said magnetic core.

Another object of the present invention is to provide an electromagnetic relay in which permanent magnet is secured to the armature member.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

Preferred embodiments will be described with reference to appended drawings hereafter.

An electromagnetic relay according to a first embodiment of the present invention is described with reference to FIG. 1.

Figure 1:
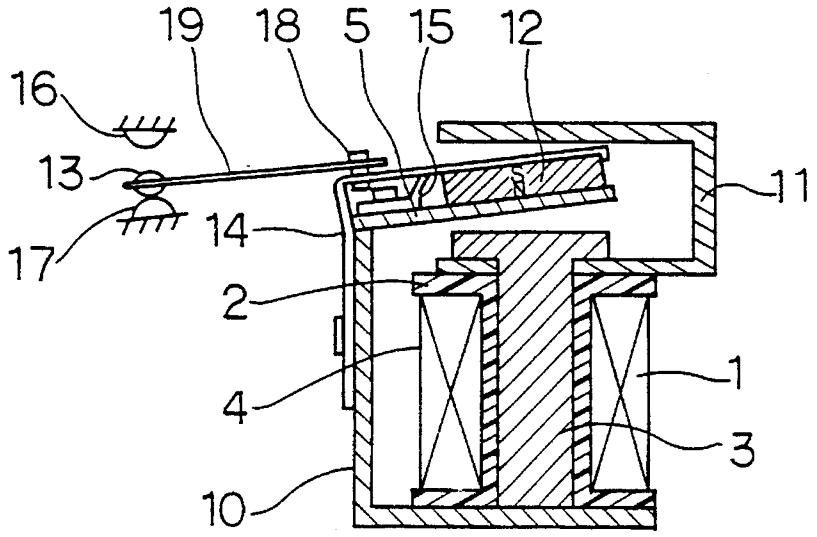
FIG. 1 is a cross-sectional side view illustrating an electromagnetic relay according to a first embodiment of the present invention.

In FIG. 1, a coil 1 is disposed in a coil bobbin 2 and connected to a electric source (not shown), and the bobbin 2 is disposed around a magnetic core 3. The coil 1 ,the bobbin 2 and the magnetic core 3 compose an electro-magnet unit 4. The electro-magnet unit 4 is designed to generate magnetomotive force sufficient to overcome magnetic force applied by a permanent magnet 12 when it is energized as described later. A U-shaped pole member 11 is secured to an upper portion of the magnetic core 3 at a lower side thereof and faces the top surface of the magnetic core 3 at an upper side thereof, and provides a space between the upper side and an upper surface of the magnetic core 3. An L-shaped yoke member 10 is secured to the bottom of the magnetic core 3 at one side thereof and extends in parallel with the electro-magnet unit 4 at the other side or upper side thereof and provides a path of magnetic flux. An armature member 5 is disposed in the space between the top surface of the magnetic core and the upper side of the U-shaped pole member 11 so as to move up and down in the space. One end of the armature member 5 is disposed in contact with a top portion of the other side of the L-shaped yoke member 10 and supported by a spring member 14 and a fastening member 15. The spring member 14 is connected to a switch plate 19 which has a movable contact 13 on one end thereof. The spring member 14 is designed to bias the armature to stay at a middle portion between the top surface of the magnet core 3 and the upper side of the pole member 11 when no load is applied thereto(before the magnet 12 is installed ). In other words the spring member acts to separate the armature member 5 from the attracting position and the retracting position. The permanent magnet 12 is secured to a portion of the armature member 5 right above the top surface of the magnetic core 3 by the spring member 14 so that magnetic flux flows through the armature member 5 in a direction opposite the magnetic flux of the coil 1 when the armature member is in the retracting position. It is noted that the permanent magnet 12 is disposed to include a line extending from the axis of the magnetic core. Reference numerals 16 and 17 are stationary contacts secured to an outside member (not shown) to establish contact with the movable contact 13 in response to the movement of the armature member 5.

Operation of the electromagnetic relay according to the first embodiment is described with reference to FIGS. 2 and 3.

Figure 2:
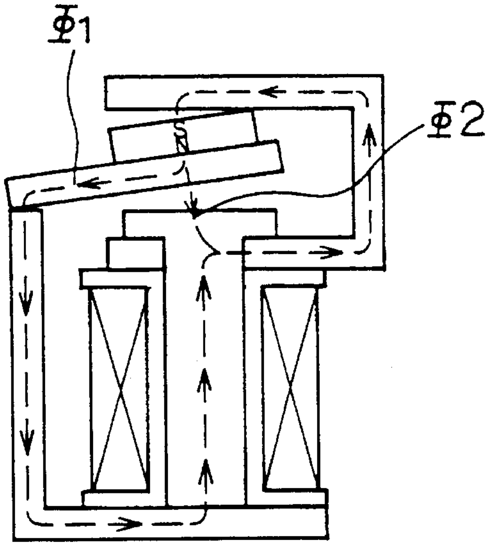
FIG. 2 is a schematic cross-sectional side view illustrating retracting operation of the electromagnetic relay according to the first embodiment.

In FIG. 2, the armature member 5 of the relay is retracted so that the armature member 5 is in abutment with the upper side of the pole member 11 and kept in position by attracting force of the permanent magnet 12. Although the spring member 14 acts to separate the armature from the position, it is negligibly small. The movable contact 13 is in contact with the upper stationary contact 16 in this position. Magnetic flux Φ1 from the permanent magnet 12 flows through the armature member 5, the L-shaped yoke 10, the magnetic core 3 and the U-shaped pole member 11 to the magnet 12, and magnetic flux Φ2 flows from the permanent magnet 12 to the U-shaped pole member directly as indicated by broken lines, thereby attracting the armature 12 to the upper side of the U-shaped pole member 11.

Figure 3:
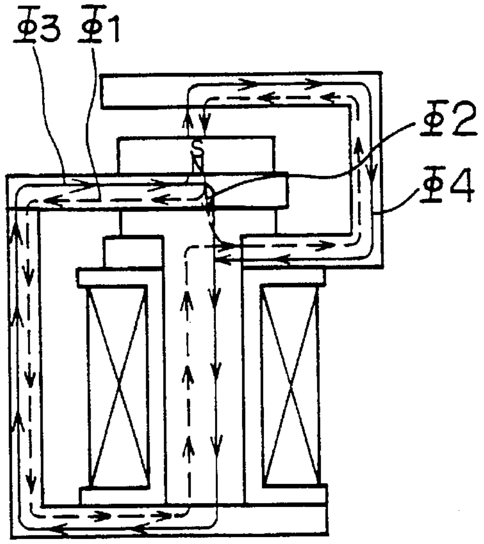
FIG. 3 is a schematic cross-sectional side view illustrating driving operation of the electromagnetic relay according to the first embodiment.

When electric current is supplied to the coil 1, magnetic flux Φ3 which flows through the armature member 5 and the yoke member 10 and magnetic flux Φ4 which flows through the U-shaped pole member are generated by the coil 1 as indicated by a solid line in FIG. 3. Since the magnetomotive force generated by the coil 1 is large enough to overcome the magnetic force applied by the permanent magnet 12, the flux Φ3 gradually prevails in the armature member 5 as it is attracted by the coil 1 and become close to the top surface of the magnetic core 3. The magnetic flux Φ2 also assists the attraction. Incidentally the flux Φ4 becomes negligibly small when the armature member 5 is in contact with the top surface of the magnetic core. When the armature member 5 is attracted by the coil 1, the movable contact 13 comes in contact with the stationary contact 17.

When the electric current supply is cut off, the electromotive force and the magnetic flux Φ3 and Φ4 generated by the coil 1 disappear, and the armature 5 is driven by the spring member 14 to move past the middle position in the space due to the inertia of the armature 5 and the magnet 12. As a result, the magnetic fluxes Φ1 and Φ2 prevail in the armature member 5 again so that the armature member 5 comes in abutment with the upper side of the U-shaped pole member 11 again as shown in FIG. 2.

As described above, since the the permanent magnet 12 is secured to the armature member 5 which is disposed in the space between the magnetic pole member 12 and the top surface of the magnetic core 3 which is the main path of the magnetic fluxes Φ1 and Φ2 of the permanent magnet 12, the magnetic flux is effectively utilized so that the size of the permanent magnet can be reduced. In other words, a relay of large capacity or high performance can be provided without increase of the size of the relay only by increasing the permanent magnet. In addition, since the spring is designed to bias the armature member 5 between the retracting position and the attracting (or driving) position, only a small amount of energy is necessary to operate the armature member 5.

Electromagnetic relays according to other embodiments of the present invention are described with reference to FIG. 4 and FIG. 5, next. Incidentally, the same reference numeral therein indicates the same or substantially the same part or portion and, therefore, detailed descriptions are given only on different parts or portions.

Figure 4:
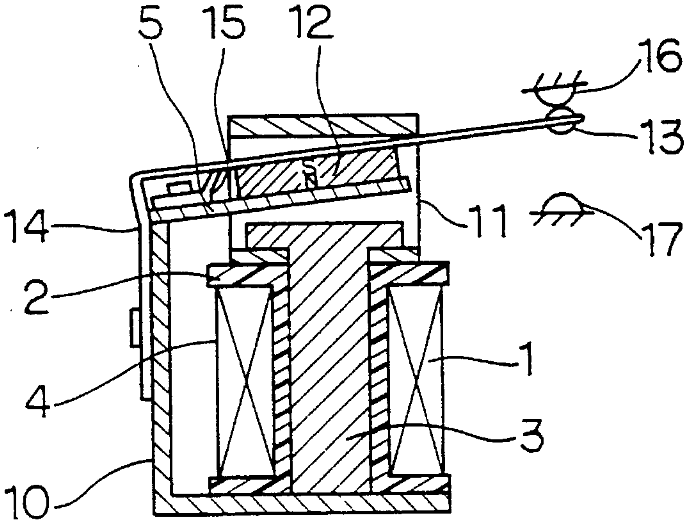
FIG. 4 is a cross-sectional side view illustrating an electromagnetic relay according to a second embodiment of the present invention.

An electromagnetic relay according to a second embodiment shown in FIG. 4 has a movable contact 13 formed on a spring member 14 directly. A U-shaped pole member 11 is also disposed differently so that the spring member 14 and the movable contact 13 can extend from the pole member 11.

Figure 5:
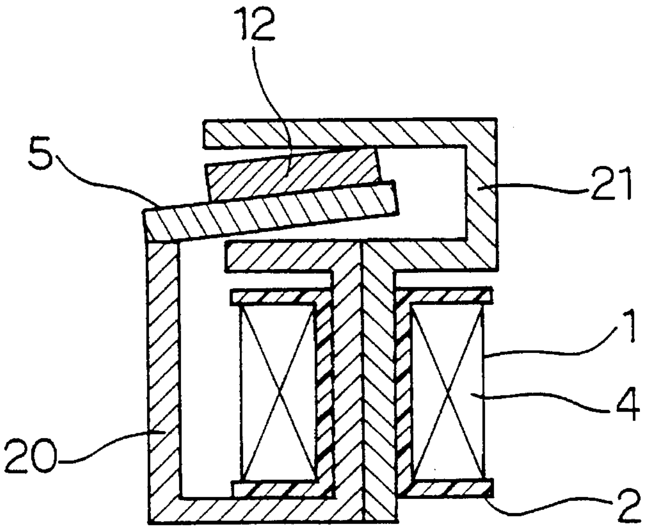
FIG. 5 is a cross-sectional side view illustrating an electromagnetic relay according to a third embodiment of the present invention.

An electromagnetic relay according to a third embodiment of the present invention is shown in FIG. 5.

A yoke member 20 and a pole member 21 are formed to have integral magnetic core portions which are combined and inserted in a coil bobbin 2. Since the yoke member 20 and the pole member 21 are formed integrally along the magnetic flux path generated by the coil 1 and the permanent magnet, leakage flux can be further reduced. In addition, the number of parts composing the relay is reduced.

The permanent magnet 12 can be secured to the upper side of the pole member 11 in the same space.

The spring member 14 can be replaced by a bendable member such as a hinge with the magnetic force of the permanent magnet 4 being increased. In this case less power consumption is expected.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An electromagnetic relay for use with an electric source comprising;

a magnetic core having a top surface and a bottom surface;

a coil bobbin disposed around said magnetic core;

a coil disposed in said coil bobbin and connected to said electric source for generating magnetomotive force when energized;

a magnetic pole member, magnetically connected said top surface of said magnetic core and having a portion facing said top surface, for providing a space between said potion and said top surface;

a yoke member magnetically connected to said bottom surface of said magnetic core;

an armature member magnetically connected to said yoke member and disposed in said space;

a permanent magnet disposed near said armature member in said space for attracting said armature member to said portion when said coil is not energized; and means for movably supporting said armature member at a portion middle in said space.

2. An electromagnetic relay as claimed in claim 1, wherein said magnetic pole member comprises a U-shaped magnetic plate having one side connected to said top surface of said magnetic core and the other side facing said top surface.

3. An electromagnetic relay as claimed in claim 1, wherein said permanent magnet is secured to said armature member.

4. An electromagnetic relay as claimed in claim 3, wherein said magnetic pole member comprises a portion of said magnetic core formed integrally therewith.

5. An electromagnetic relay as claimed in claim 4, wherein said magnetic pole member comprises a magnetic plate.

6. An electromagnetic relay as claimed in claim 2, wherein said permanent magnet is disposed at a position which includes a line extending from an axis of said magnetic core.

7. An electromagnetic relay as claimed in claim 1, wherein said magnetic pole member has a surface facing said permanent magnet which is as wide as a surface of said permanent magnet.

8. An electromagnetic relay as claimed in claim 2, wherein said permanent magnet is secured to a portion of said magnetic pole member in said space.

9. An electromagnetic relay as claimed in claim 1, wherein said supporting means comprises a spring member connecting said yoke member and said armature member.

10. An electromagnetic relay as claimed in claim 9, wherein said supporting means comprises a hinge member connecting said yoke member and said armature member.

11. An electromagnetic relay having a switch for use with an electric source comprising;

a magnetic core having a top surface and a bottom surface;

a coil wound around said magnetic core and energized by said electric source to generate magnetomotive force when energized;

a yoke member magnetically connected to said bottom surface of said magnetic core for providing a first magnetic path of magnetic flux generated by said coil;

a magnetic pole member, magnetically connected to said top surface of said magnetic core, for providing a second magnetic path and a space;

an armature member, magnetically connected to said yoke member and movably disposed in said space and said second magnetic path to face said top surface, for driving said switch in response to said magnetomotive force of said coil;

a permanent magnet, disposed in said space between said magnetic pole member and said armature member, for supplying magnetic flux to said first and second magnetic paths, thereby driving said armature in a direction to separate from said top surface when said coil is deenergized; and means for retaining said armature member at a middle of said space so that said armature member is driven by said permanent magnet when said coil is not energized and is driven by said coil in a direction to abut said top surface when said coil is energized.

12. An electromagnetic relay as claimed in claim 11, wherein said retaining means comprises a spring member.

13. An electromagnetic relay as claimed in claim 12, wherein said spring member comprises a movable contact of a switch.

14. An electromagnetic relay as claimed in claim 13, wherein said coil generates magnetomotive force in a direction to cancel magnetic flux of said permanent magnet in said armature member when energized.

* * * * *